(12) United States Patent
Haag et al.

(10) Patent No.: US 6,512,202 B2
(45) Date of Patent: Jan. 28, 2003

(54) APPARATUS AND METHOD FOR HEATING A STEERING WHEEL

(75) Inventors: Ronald Helmut Haag, Clarkston, MI (US); Mansour Ashtiani, Beverly Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/796,053

(22) Filed: Feb. 28, 2001

(65) Prior Publication Data

US 2001/0030182 A1 Oct. 18, 2001

Related U.S. Application Data (60) Provisional application No. 60/185,266, filed on Feb. 28, 2000.

(51) Int. Cl.[7] .............................. B62D 1/06; H05B 3/18
(52) U.S. Cl. ..................... 219/204; 219/528; 219/535; 219/549; 74/558
(58) Field of Search ................. 219/204, 528, 219/529, 549, 535; 74/558

(56) References Cited

U.S. PATENT DOCUMENTS

| | | | | | |
|---|---|---|---|---|---|
| 1,168,146 | A | * | 1/1916 | Barnes | 219/204 |
| 2,392,539 | A | * | 1/1946 | Leible | 219/204 |
| 4,535,221 | A | * | 8/1985 | Holsworth | 219/204 |
| 4,547,655 | A | * | 10/1985 | Kurata et al. | 219/204 |
| 4,549,069 | A | * | 10/1985 | Oge | 219/204 |
| 4,631,976 | A | * | 12/1986 | Noda et al. | 219/204 |
| 4,983,814 | A | * | 1/1991 | Ohgushi et al. | 219/529 |
| 5,072,093 | A | | 12/1991 | Scheuerer | |
| 5,294,775 | A | * | 3/1994 | Carrier | 219/204 |
| 5,676,872 | A | * | 10/1997 | Garcia-Rodriguez | 219/549 |
| 5,761,968 | A | * | 6/1998 | Poteet | 74/558 |
| 5,847,360 | A | * | 12/1998 | Lorenzen et al. | 219/204 |
| 6,093,910 | A | * | 7/2000 | McClintock et al. | 219/549 |
| 6,172,344 | B1 | * | 1/2001 | Gordon et al. | 219/529 |
| 6,326,593 | B1 | * | 12/2001 | Bonn et al. | 219/204 |

FOREIGN PATENT DOCUMENTS

| | | | | |
|---|---|---|---|---|
| DE | 2951871 | * | 7/1981 | |
| DE | 3837743 | * | 5/1990 | |
| DE | 19528788 | | 8/1996 | |
| DE | 20007043 | * | 8/2000 | |
| EP | 437641 | * | 7/1991 | |
| EP | 0437641 | | 7/1991 | |
| EP | 0857643 | | 8/1998 | |
| GB | 425360 | * | 3/1935 | 219/204 |
| GB | 1179895 | * | 2/1970 | 219/204 |
| GB | 002285729 | | 7/1995 | |
| JP | 60-18447 | * | 1/1985 | |
| JP | 61-218475 | * | 9/1986 | |
| JP | 9-76922 | * | 3/1997 | |
| WO | 99/39964 | | 8/1999 | |

* cited by examiner

*Primary Examiner*—Joseph Pelham
(74) *Attorney, Agent, or Firm*—Kathryn A. Marra (57) ABSTRACT

A preformed heating element for use in a steering wheel including a heating element, embedded into a rubber or polyurethane material and preformed with manufacturing methods such as vacuum forming, resin impregnating, injection molding, and pultrusion progressive die.

32 Claims, 12 Drawing Sheets

APPARATUS AND METHOD FOR HEATING A STEERING WHEEL

CROSS REFERENCE TO RELATED APPLICATIONS

This application claims the benefit of United States Provisional Patent Application, No. 60/185,266, filed on Feb. 28, 2000, the contents of which are incorporated herein by reference thereto.

This application is related to commonly owned and assigned U.S. Pat. No. 6,093,908, the contents of which are incorporated herein by reference thereto.

This application is also related to commonly owned and assigned U.S. Pat. No. 6,172,342, the contents of which are incorporated herein by reference thereto.

TECHNICAL FIELD

The present invention relates to a steering wheel for a vehicle, and more particularly, to an element for heating portions of the steering wheel, and a process for its manufacture.

BACKGROUND OF THE INVENTION

A number of attempts have been made to provide a steering wheel with a heater element to alleviate the uncomfortable touching of the steering wheel by a driver during cold weather.

The usual approach has involved the use of a length of resistance wire as heating elements, which are embedded within the steering wheel or which extend within a hollow steering wheel. An electrical current is then arranged to pass through the resistance wire.

However, such prior art arrangements have not been very successful due to various factors. Some of these prior art arrangements are complex and require major structural modifications of the steering wheel itself which unduly adds to the cost of manufacture. A further difficulty includes the method of assembling such heating elements due to the complex three-dimensional shape of modern steering wheels, and the poor elongation characteristics of the heating element.

SUMMARY OF THE INVENTION

Therefore, it is an object of the present invention to create a heated steering wheel with a preformed heating element that provides for a simple method of its assembly on the steering wheel, and moreover, a preformed heating element that protects an internal heating element.

Another object of the present invention to provide a preformed heating element for a steering wheel of an automotive vehicle that is easily applied to the steering wheel.

A preformed heating element for use in a heated steering wheel having a conductive member and a molded member, where the conductive member is embedded onto the molded member.

A preformed heating element for providing a smooth surface for application of a steering wheel cover.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings, in which.

DETAILED DESCRIPTION OF THE INVENTION

Figure 1:
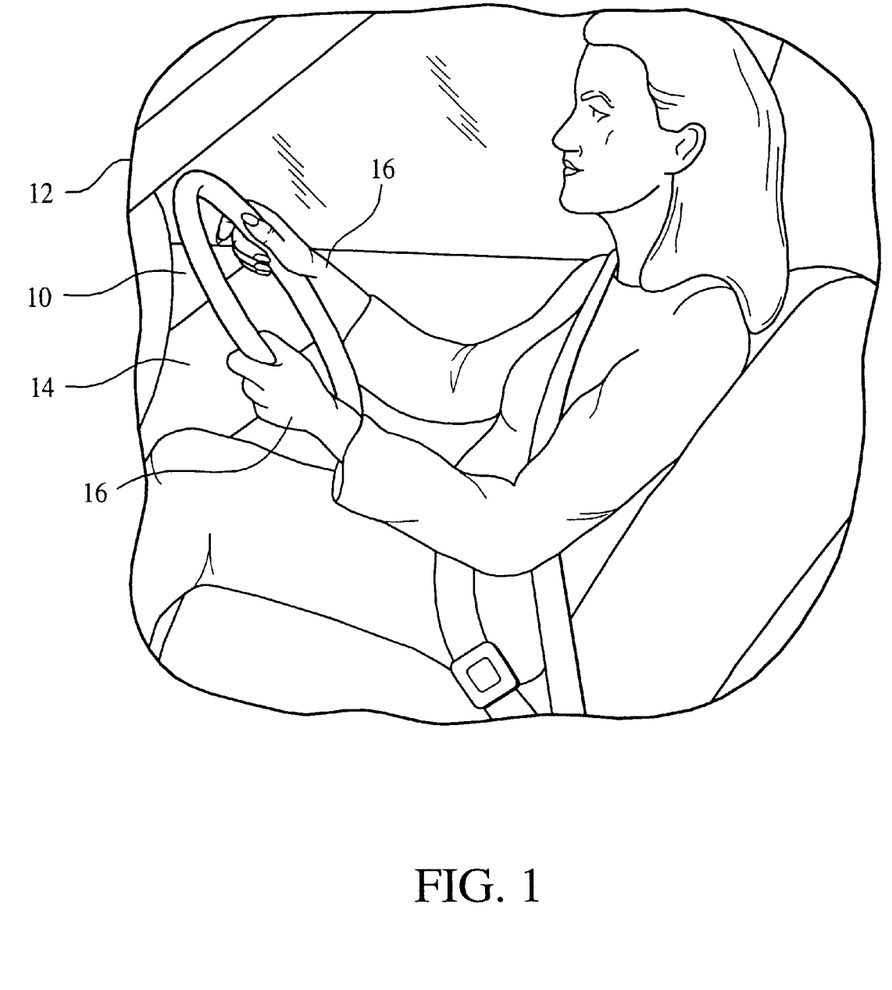
FIG. 1 is a perspective view of a heated steering wheel, according to one embodiment of the present invention, illustrated in operational relationship with a vehicle.

Referring now to FIG. 1, one embodiment of a heated steering wheel 10 is illustrated in an operational configuration inside a partially shown automobile vehicle, generally designated at 12. Heated steering wheel 10 is operably connected to a steering mechanism 14. Heated steering wheel 10 is gripped by an operator's hand 16 to guide automobile vehicle 12 in the desired direction. Advantageously, heated steering wheel 10 warms up the operator's hands 16 when the ambient temperature is cool, causing the steering wheel insert and covering to remain cool even after the vehicle is warmed up. In particular, a steering wheel covered with leather will remain cool after the vehicle's heating system has been turned on.

Heated steering wheel 10 allows the driver to grip the wheel in comfort without gloves, even on the coldest winter days. However, constant gripping of the steering wheel by the operator may damage the wires or heating element on the steering wheel. Thus, by encapsulating the heating element into a preformed element, the damaging problem is alleviated. In addition, the manufacturing process of the steering wheel is simplified.

Figure 2:
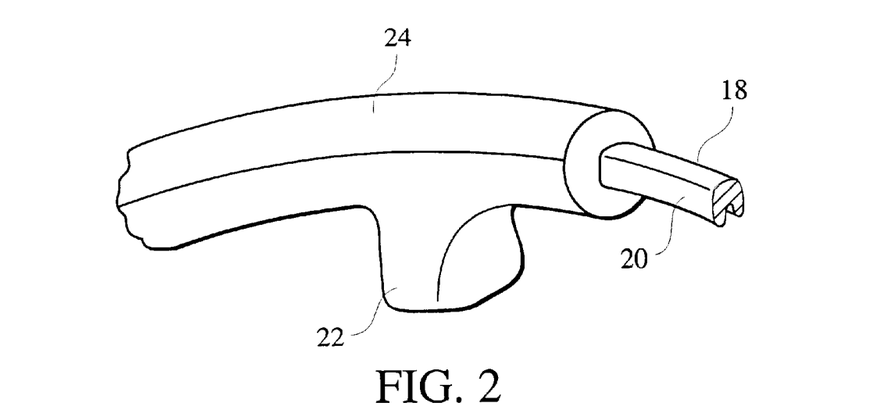
FIG. 2 is a cross-sectional view of a portion of a steering wheel.
Figure 3:
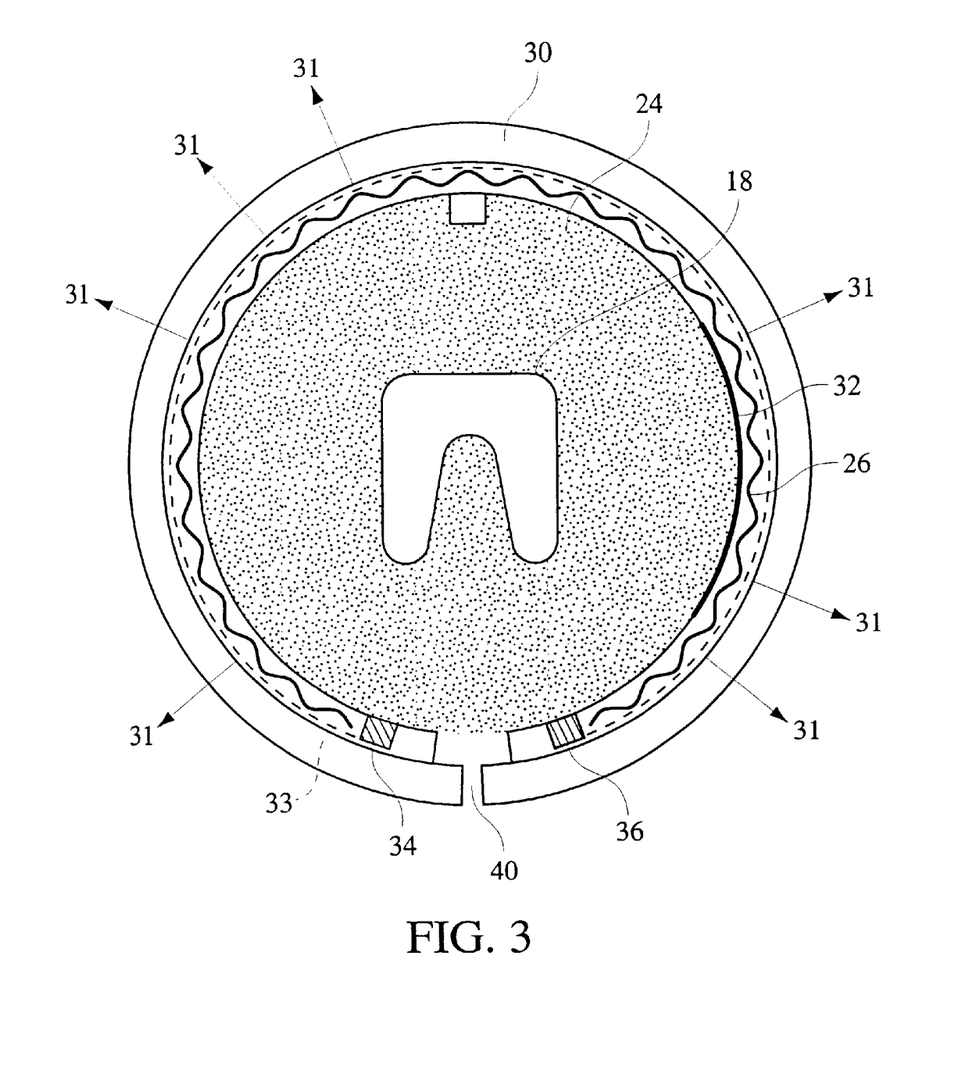
FIG. 3 is a cross-sectional view of a heated steering wheel.

Referring now to FIGS. 2 and 3, heated steering wheel 10 includes a frame portion 18 that defines the shape of heated steering wheel 10. Preferably, frame portion 18 is made from a metal material such as magnesium. Frame portion 18 includes an inner rim (not shown), an outer rim 20 circumscribing inner rim, and at least a spoke 22 interconnecting the inner rim with outer rim 20. The inner rim, outer rim 20, and spoke 22 form an integral and one-piece frame portion 18 for heated steering wheel 10.

Heated steering wheel 10 also includes a cushion member 24 that encloses frame portion 18, preferably around outer rim 20 and over spokes 22. Cushion member 24 cushions frame portion 18 to enhance the comfort of heated steering wheel 10 for the operator's hands 16. Cushion member 24 is preferably made of a cushioning material such as polyurethane, which can be easily molded to conform to the shape of frame portion 18.

Heated steering wheel 10 also includes a preformed heating element 26. Preformed heating element 26 is molded to have an integral heating element 28 disposed within preformed heating element 26. In an exemplary embodiment, preformed heating element 26 is manufactured out of preformed rubber or polyurethane. In one embodiment, preformed heating element 26 is manufactured by a vacuum-bagging method wherein heating element 26 is sandwiched in between two layers of uncured silicon rubber which are formed into preformed heating element 26.

In yet another alternative, the rubber is vulcanized to form the preformed heating element.

As an alternative, preformed heating element 26 is manufactured using high pressure liquid injection molding (LIM) or "RIM" nylon reaction injected molding or transfer molding "RTM" or vulcanizing of the rubber.

Once molded preformed heating element 26 is positioned over cushion member 24, it provides heat to an outer wrap 30 surrounding heating element 26. Outer wrap 30 provides the exterior surface of heated steering wheel 10, which is gripped by operator's hands 16. Preformed heating element 26 is preformed by different preforming methods, which will be described herein, to conform to the shape of heated steering wheel 10.

Outer wrap 30 covers over preformed heating element 26 and cushion member 24 to provide a decorative appearance to heating steering wheel 10. It should be appreciated that outer wrap 30 may be made from a combination of materials to achieve the desired decorative appearance. For example, a portion of outer wrap 30 covering outer rim 20 and spoke 22 may be a material such as leather, while a portion of the outer wrap 30 covering the inner rim may be a material such as plastic.

Advantageously, the preformed heating element provides for the elimination of irregularities and protrusions associated with conventional heating elements on the steering wheel, which can be seen through the leather covering. In order to provide for a smooth surface, and an aesthetically pleasing and smooth outer appearance of the steering wheel, the preformed heating element is utilized. It should be appreciated that the preformed heating element may be applied to a variety of wheel designs such as leather-wrapped design, or a two-shot, molded polyurethane design. It is also suitable for two-, three-, and four-spoke designs.

The preformed heating element provides for easy assembly of the element during the manufacturing process of the heated steering wheel. Instead of applying a heating element directly on the steering wheel with adhesive or other means, the preformed heating element allows for a quick, accurate, and less damaging assembly on the heated steering wheel. Thus, the assembly of the heated steering wheel is less labor intensive.

Also, the preformed heating element can be fully tested prior to assembly and production of the final steering wheel.

In addition, by creating the preformed heating element with the heating element encapsulated into the same, it allows the manufacturer to mold around the finger forms and spokes of the wheel. In addition, the preformed heating element provides a more uniform distance of the heating element away from the outside of the wheel, allowing for even distribution of the heat throughout the wheel. In particular, the exterior portions are capable of being heated without having to worry about unsightly show through of the heating element.

In order to position the preformed element around the heated steering wheel during assembly, and after the preformed heating element is manufactured and/or molded, one end of the preformed heating element is opened up along a split line 38, which is created during the manufacturing process. The split line is created by the molds or by cutting the preformed heating element to remove it from the mold during the manufacturing process.

After the preformed heating element is opened up, it is positioned around cushion member 24. The preformed heating element is then opened up along the split line as it traverses the circumference of the heated steering wheel as it is being placed over the cushion member of the steering wheel.

After the preformed heating element is completely placed around the steering wheel, the preformed heating element closes back into its original shape. This memory characteristic of the preformed heating element which allows it to close back into the original configuration after it has been opened up along the split line is facilitated by the elastic characteristics inherent to the polyurethane or rubber molded material.

Thus, there are no adjustments to be made to the preformed heating element as it is sized to fit over the steering wheel. The preformed heating element can be configured to cover part or all of the exterior steering wheel. The preformed heating element has spoke portions or openings 23 that also facilitate the ease of installation and positioning of preformed heating element 26.

Figure 6:
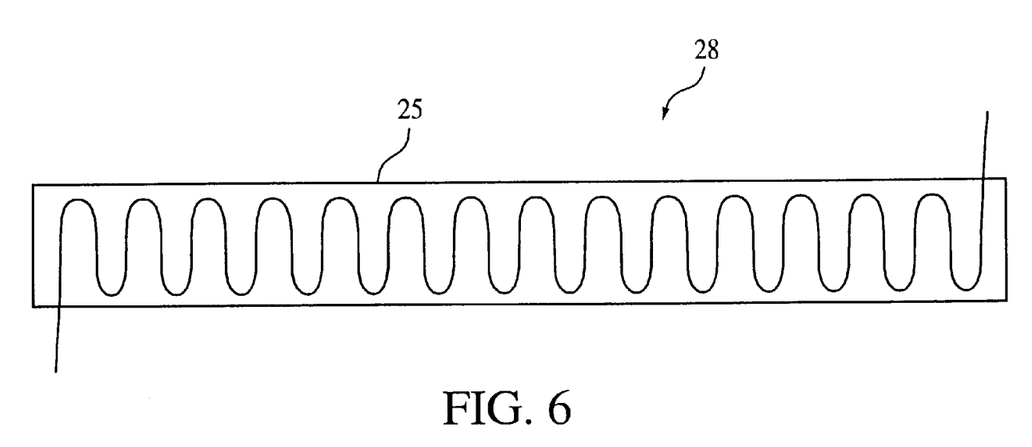
FIG. 6 is a top plan view of an alternative heating element.
Figure 7:
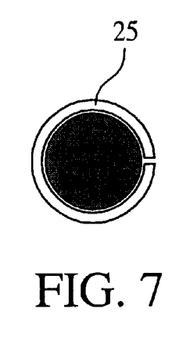
FIG. 7 is a cross-sectional view of the heating element of FIG. 6 installed on a mold.
Figure 8:
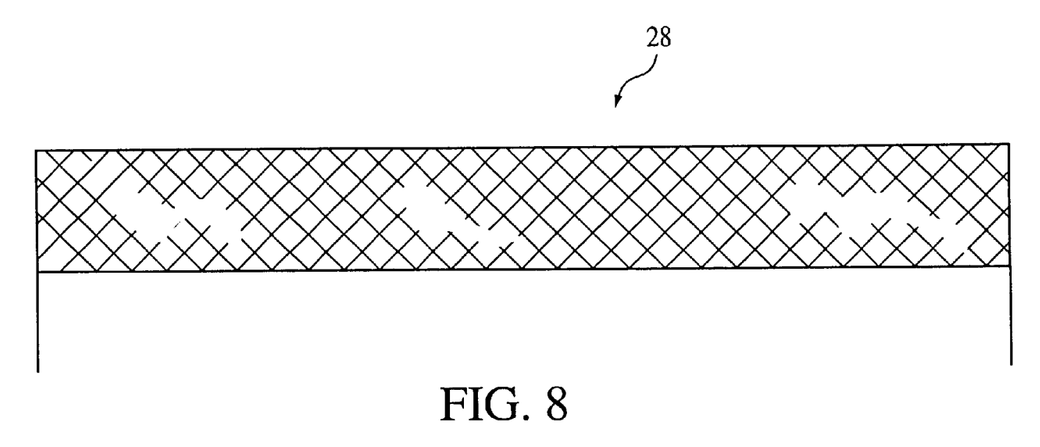
FIG. 8 is a top plan view of an alternative heating element.
Figure 9:
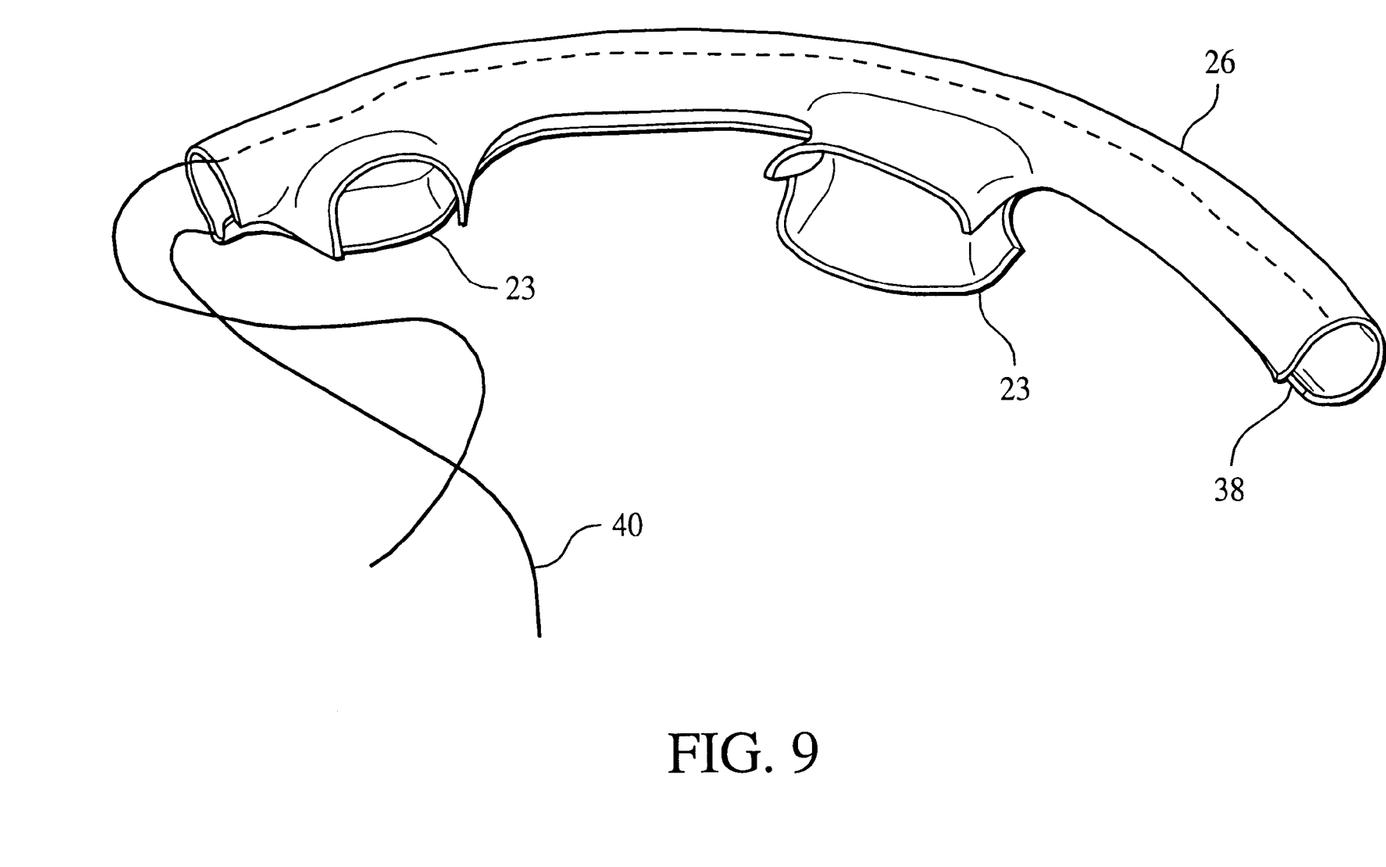
FIG. 9 is an isometric view of a preformed heating element for a partially heated steering wheel.
Figure 10:
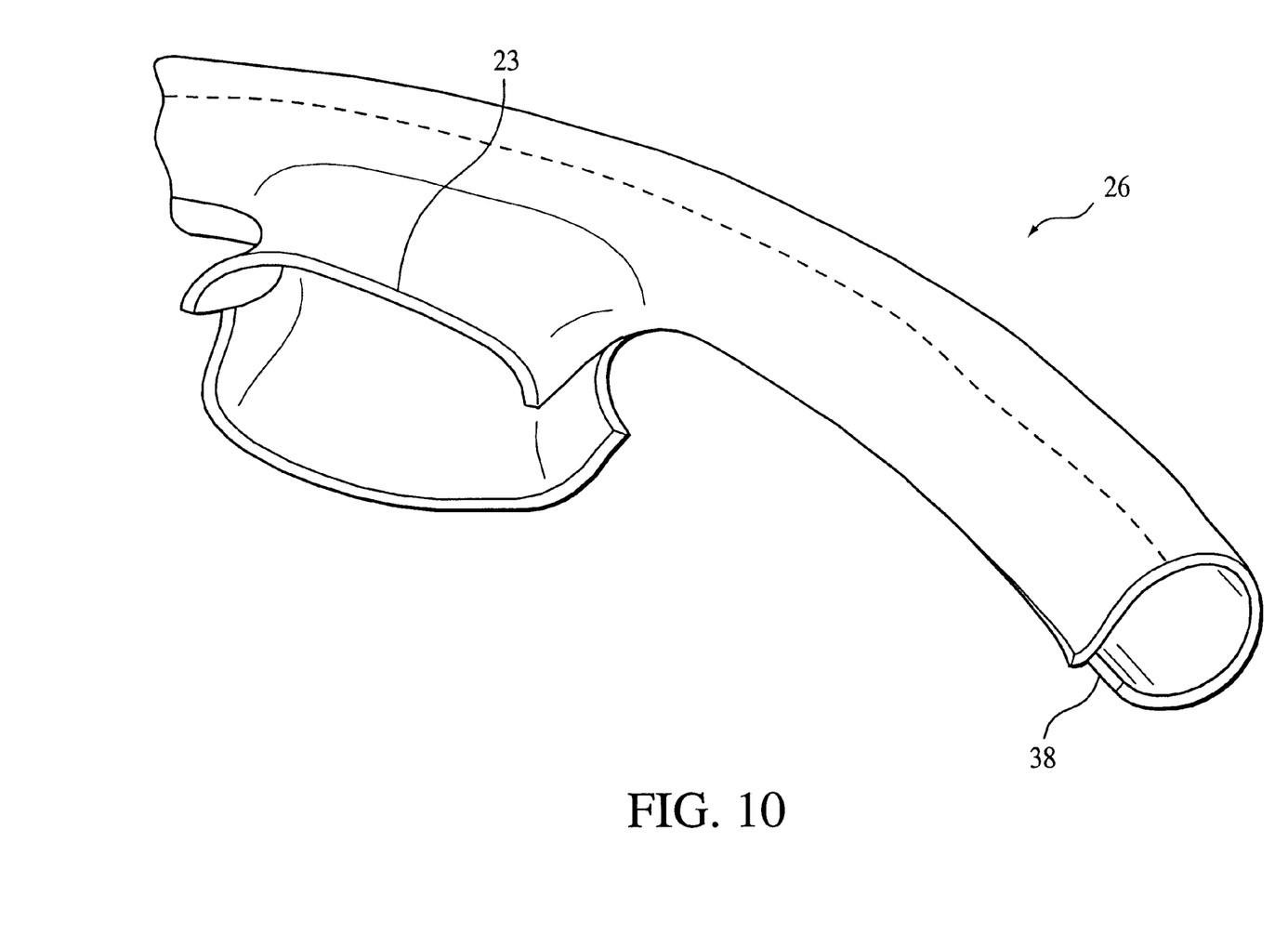
FIG. 10 is an enlarged isometric view of the preformed heating element of FIG. 9.

In one embodiment, heating element 28 is a double adhesive tape 25 having an electrical wire 27 disposed on one side, while the other is secured to a mold for preformed heating element 26 (FIGS. 6 and 7). In this embodiment, the adhesive tape allows the heating element to be placed on the steering wheel mold or mandrel. During the manufacturing process, a preformed heating element 26, which includes the application of heated materials to the mold, causes the adhesive tape to melt during the molding process (LIM, RTM, vacuum-bagging), leaving only the heating element to be encased in the polymer or rubber.

In another embodiment, the heating element is a flexible and stretchable wire mesh capable of providing a source of heat when an electric current is passed therethrough, and which is placed upon an upper surface of a double adhesive tape or directly on the mandrel.

In another embodiment, an etched foil or a polyimide circuit is utilized to provide the heating element.

Figure 4:
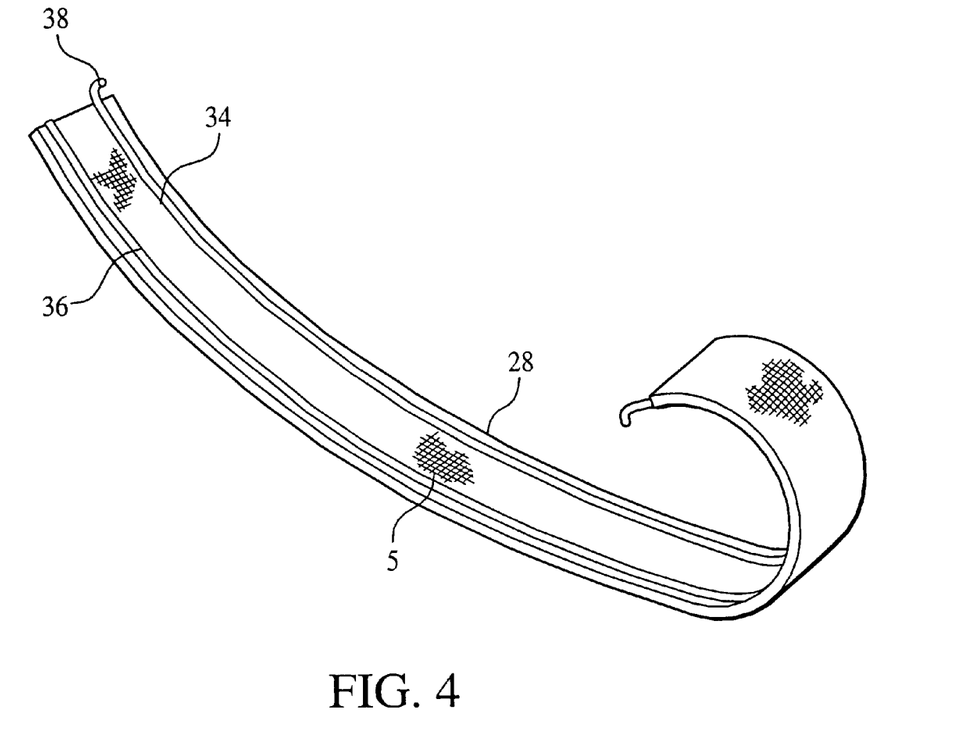
FIG. 4 is a perspective view of a heating element for a heated steering wheel.
Figure 5:
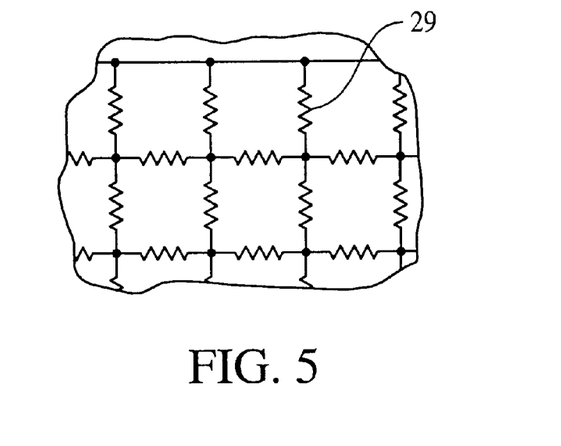
FIG. 5 is an enlarged view of an electrically conductive carbon fiber woven textile for the heating element of FIG. 4.

In one embodiment, heating element 28 is an electrically conductive woven textile member, such as a carbon fiber woven textile (FIGS. 4 and 5). An example of a carbon fiber woven textile member is disclosed in UK Patent Number, GB2285729B, to Gortix, LTD., the contents of which are incorporated herein by reference thereto.

Of course, other electrically conductive materials, such as copper wires or copper wire mesh, beryllium copper woven mesh, or nickel coated copper wire may be used to provide heat to heating element 28.

Alternatively, the heating element 28 may also include a copper berrilium wire mesh element, instead of the carbon fiber woven textile, as the conductive heat generating element of the heating element.

Referring to FIGS. 4 and 5, carbon fiber woven textile member 28 contains a plurality of woven fibers 29. Each fiber 29 is a small resistor, with a plurality of fiber resistors 29 arranged in parallel. For example, a one (1) mm square contains many parallel fiber resistors 29. The total combination of parallel fiber resistors 29 adds up to the total resistance value. The many parallel fiber resistors 29 provides for more even heat distribution.

Advantageously, if one fiber resistor 29 breaks, there is minimal effect on overall resistance of the woven textile member 28. Also, the carbon. fiber woven member 28 has a unique property of a negative temperature coefficient.

The preformed heating element protects the heating element from being damaged during the assembly and manufacture of the heated steering wheel. Moreover, the preformed heating element encases and protects the heating element from being damaged by the grouping of the hands of the vehicle operator.

Since the heating elements are fragile, the handling and assembly of the material by directly adhering the material onto the steering wheel during manufacture without the preformed heating element of the present invention, may cause damage to the heating element. Moreover, such assemblies allow the heating element to be moved and manipulated by the hands of the vehicle operator.

Therefore, by pre-forming the heating element into the preformed heating element of the present invention, , the likelihood of damage to the heating element is substantially reduced during the assembly and manufacture. In addition, the preformed heating element protects the element from damage during use, and also prevents the heating element from being seen from the upper surface of the steering wheel.

Referring now to FIG. 3, heated steering wheel 10 may include an insulating sheet 32 disposed between preformed heating element 26 and cushion member 24, to direct the flow of heat in an outwardly direction to outer leather wrap 30, as illustrated by arrows 31 in FIG. 3.

Preformed heating element 26 may be placed on cushion member 24 using a suitable method. For example, preformed heating element 26 may include an adhesive backing for securely positioning preformed heating element 26 on cushion member 24.

The preformed heating element operates through a controller connected to vehicle's electrical power supply. One example of such a controller is illustrated in U.S. Pat. No. 6,172,342, filed on Sep. 15, 1999, the contents of which are incorporated herein by reference thereto.

Referring to FIGS. 9–13, preformed heating element 26 may be a partial element covering only a portion of the steering wheel and providing sectional heating zones on the steering wheel. This is particularly useful in applications where the steering wheel has decorative portions 62, such as wood and/or plastic. In these applications, the mold or mandrel (FIG. 13) has a larger circumference corresponding to the decorative portions of the steering wheel. The larger circumference of the decorative portions has a lip portion 64 corresponding to the interface of preformed heating element 26 and decorative portion 62. In an exemplary embodiment, decorative portion 62 has a diameter approximately 1.5 mm larger than the diameter of the portions upon which preformed heating element 26 is formed. Of course, and as applications may require, the thickness of preformed heating element 26 may vary to be either larger or smaller than 1.5 mm.

Figure 19:
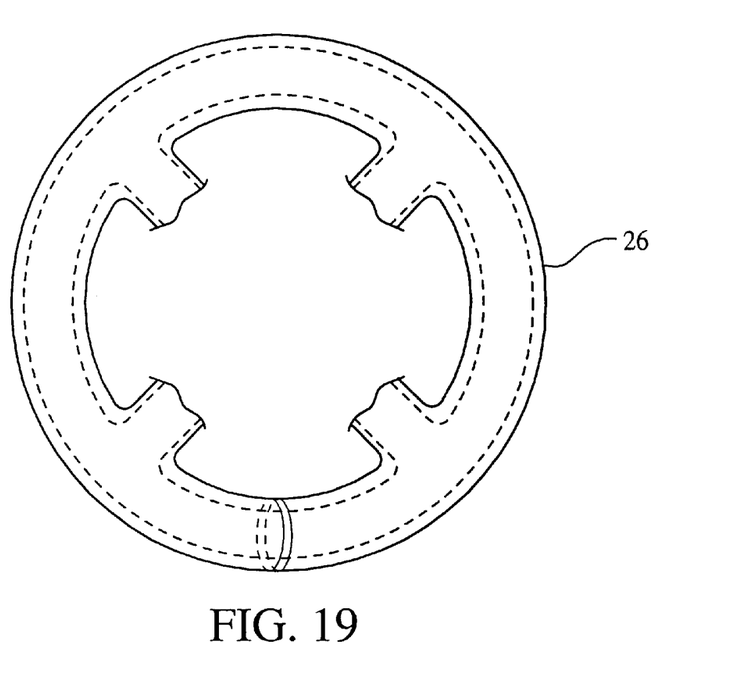
FIG. 19 is a view illustrating a full circumference preformed heating element on a steering wheel.
Figure 20:
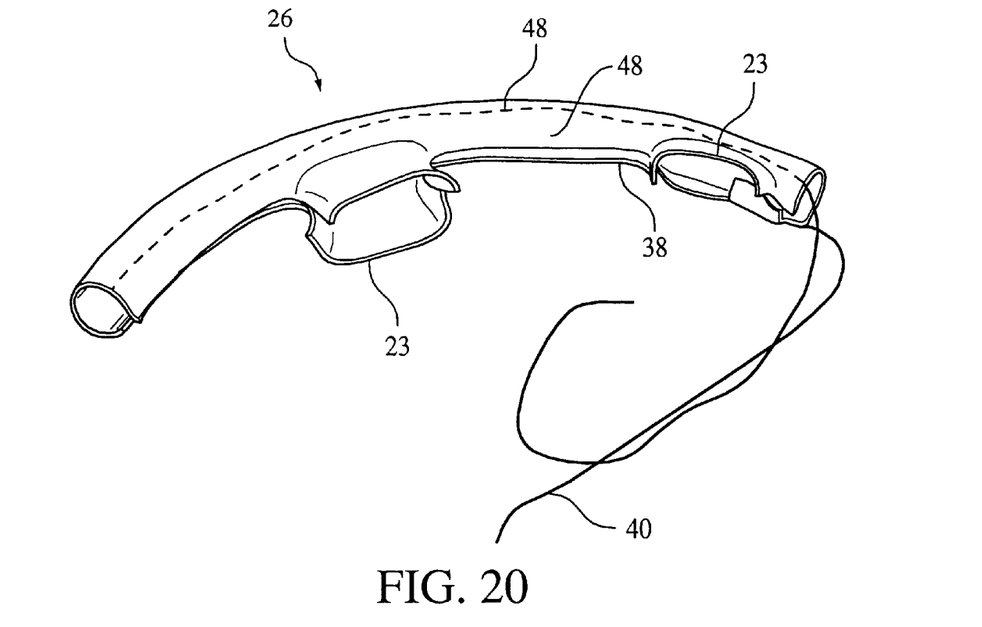
FIGS. 20 and 21 are isometric views of a preformed heating element for a partially heated steering wheel.
Figure 21:
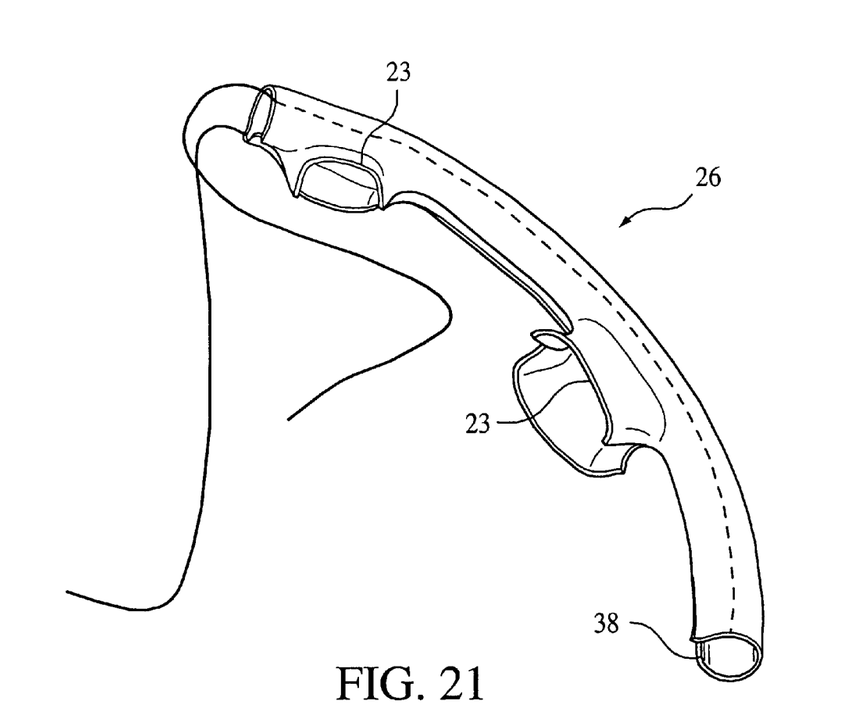

Alternatively, preformed heating elements provide a full circumferential preformed heating element 26 covering the whole circumference of the steering wheel (FIG. 19).

Referring to FIGS. 3, 11A–11C, and FIG. 14, a preferred method of manufacturing the preformed heating element involving a vacuum-forming or vacuum-bagging method is illustrated. It should be appreciated that alternative methods of manufacturing, which will be described herein, are also contemplated to be within the scope of the present invention. Preformed heating element 26 includes a first bus bar 34 and a second bus bar 36 attached and embedded into heating element 28 preferably by glue, or other alternative methods such as sewing or weaving. The bus bars are connected to a terminal wire 40 which provides electrical DC current to the conductive carbon fiber material to heat up preformed heating element 26.

Figure 11A:
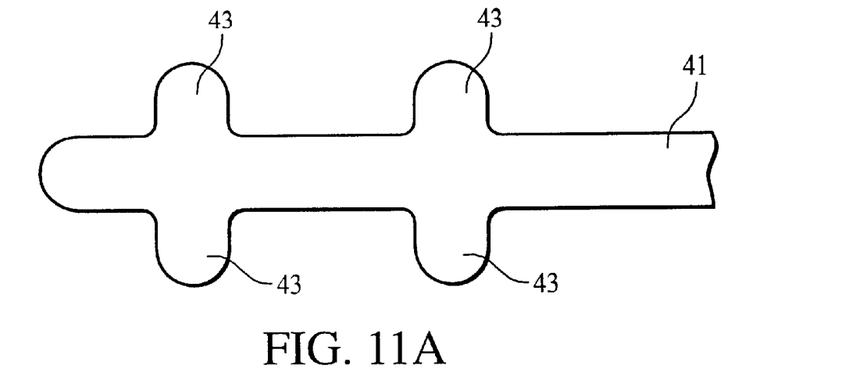
FIGS. 11A–11C illustrate a molding process for manufacturing the preformed heating element according to an embodiment of the present invention.
Figure 11B:
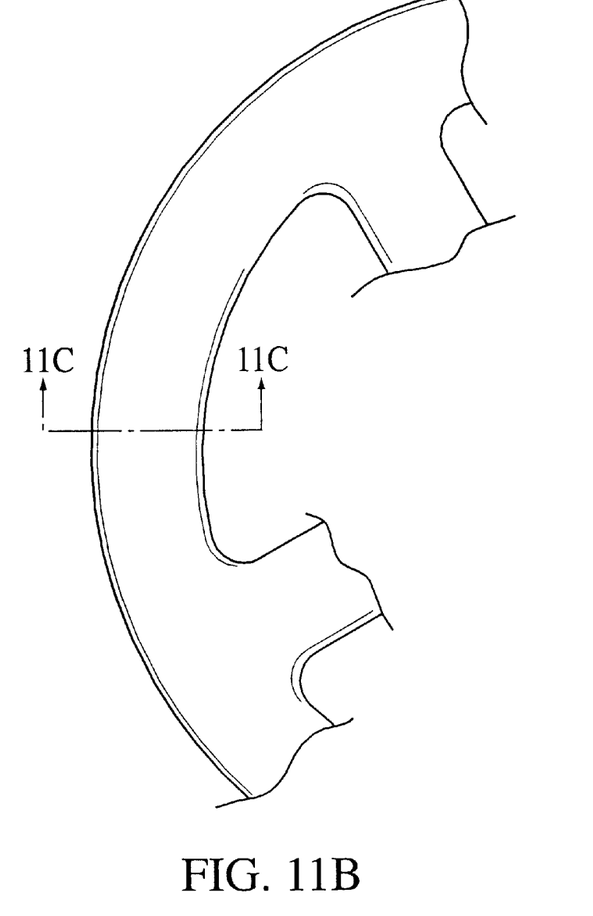
Figure 11C:
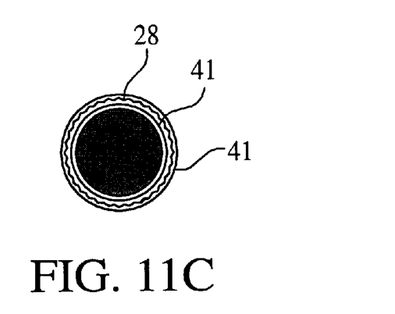
Figure 12:
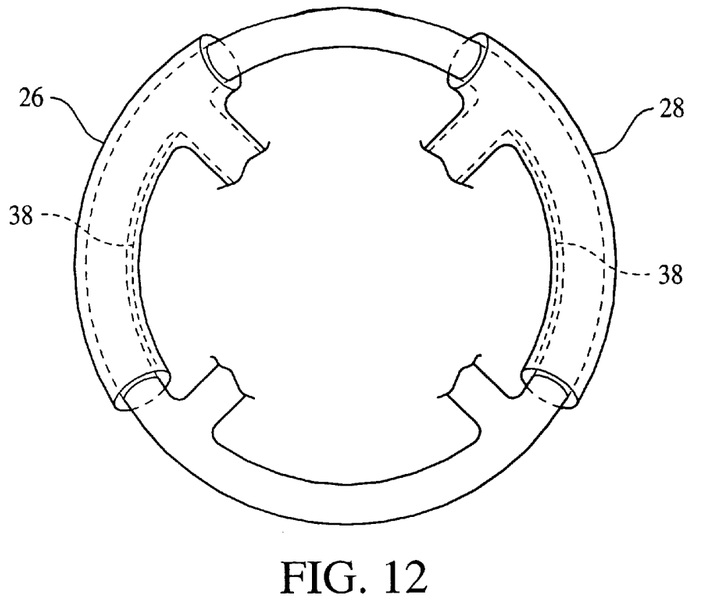
FIG. 12 is a view illustrating a sectional embodiment of the preformed heating element on the steering wheel.

The bus bars and terminal wires 38 attached to the bus bars, as well as any desired temperature measuring devices such as a thermister 66 are first attached to the heating element. Then heating element 28 is placed between two layers of a thermoplastic elastomer material 41, such as uncured silicon rubber. At this stage, the silicon-encased heating element and the attached bus bars and terminal wires are placed and wrapped around a steering wheel mold 42. FIGS. 11A–11C, and in particular FIG. 11A, illustrates the elastomer material for a partial preformed heating element in an unwrapped state. The elastomer material 41 has tab portions 43 of varying size to correspond to spoke portions of the steering wheel and steering wheel mold.

A few small pieces of adhesive tape are also used to hold the silicon-encased heating element around steering wheel mold 42.

Figure 14:
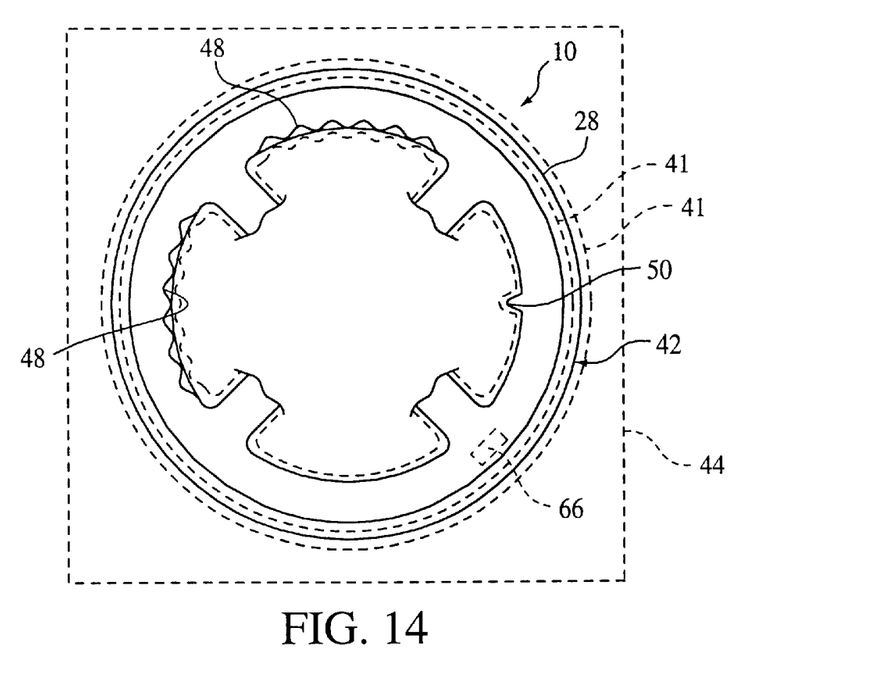
FIG. 14 is a schematic of one method of manufacturing the preformed heating element involving vacuum forming.

Steering wheel mold 42 has the identical dimensions of heated steering wheel 10 having a full outside diameter of the steering wheel minus the thickness of the heating element and outer wrap 30. In an exemplary embodiment, preformed heating element 26 has a thickness of 1 mm to allow disbursement of the heat generated by heating element 28.

As an alternative, the preformed heating element is formed out of a thermally conductive silicon rubber, which allows the heat generated by heating element 28 to be disbursed uniformly throughout preformed heating element 26.

Steering wheel mold 42 is preferably made of a metal material such as steel, or in the alternative, an acrylic material. Steering wheel mold 42 further includes finger forms 48 (partially shown) and/or locator tab 50 protrusions for creating corresponding finger forms and locator on the carbon fiber material. In an exemplary embodiment, finger forms 48 are found throughout the entire preformed heating element.

The steering wheel mold having the silicon-encased heating element wrapped around it is then placed in a vacuum bag 44 or a vacuum chamber where suction is applied inside the bag or the chamber. Vacuum bag 44 or vacuum chamber is then placed on a holding rack and placed inside an oven set at approximately 350 degrees Fahrenheit for approximately 30 minutes, allowing the silicon material to cure. Once the silicon material is cured, the steering wheel mold is then removed from the vacuum bag or vacuum chamber, and the created preformed heating element is removed from around the mold. The preformed heating element is removed by cutting along a seam line on the interior side of the preformed element where split line 38 is created. Alternatively, the vacuum bag or vacuum chamber can be configured to make contact with the steering wheel mold 42 at a location to provide the split line.

Figure 15:
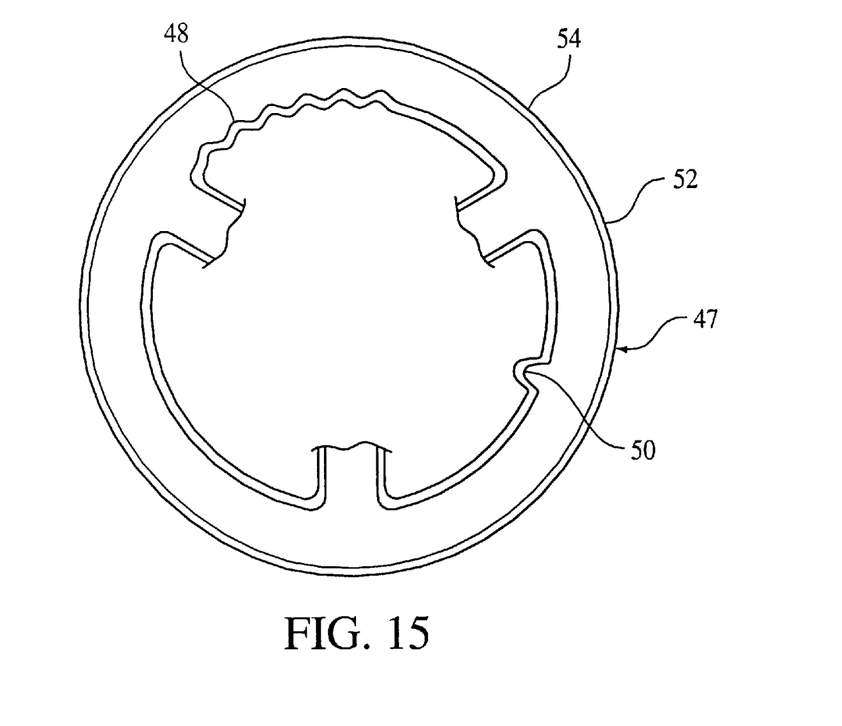
FIG. 15 is a schematic of an alternative method of manufacturing the preformed heating element involving resin impregnation.

Referring to FIG. 15, an alternative method of manufacturing the preformed heating element is illustrated. Broadly, this method involves a resin impregnation process where the carbon fiber member is impregnated with a thermosetting material and placed on a steering wheel mold to cure, and then finally removed after it has been cured. In this method, steering wheel mold 42, having the dimensions of the heated steering wheel, as described in the above method, is utilized.

Steering wheel mold 42 is preferably sprayed with a mold release material 52 such as silicon. As described hereinabove, steering wheel mold 42 should also account for finger forms 48 and/or locator tab 50, which allow the preformed heating element to be assembled on the steering wheel accurately and quickly. It should be appreciated that the finger forms on the steering wheel may also function as the locator tab, where finger form protrusions on the steering wheel correspond and are placed inside corresponding finger forms on the preformed heating element.

The heating element is impregnated with a thermosetting material such as polyester or vinyl. The thermosetting material is preferably heat curable. The thermosetting material may be sprayed, or in the alternative, knife coated with the thermosetting material. Once the heating element has been impregnated with the heat curable thermosetting material, then resin-impregnated heating element 54 is placed on steering wheel mold 42 having the exact dimensions of the steering wheel and permitted to be thermally cured by the heated die. It should be noted that the heating element should be fully impregnated to be able to securely contain the heating element and prevent them from moving within the material. If the heating element is not fully impregnated with the thermosetting material, then portions of the heating element may be displaced within the preformed heating element, and therefore break.

Advantageously, the resin impregnation method permits the desired porosity, integrity, and stiffness of preformed heating element 26 to be controlled by determining the amount of resin thermosetting material applied to the carbon fiber element. Therefore, an increased application of the resin would result in a stronger and structurally stiffer preformed heating element 26 being placed around the steering wheel.

Figure 16:
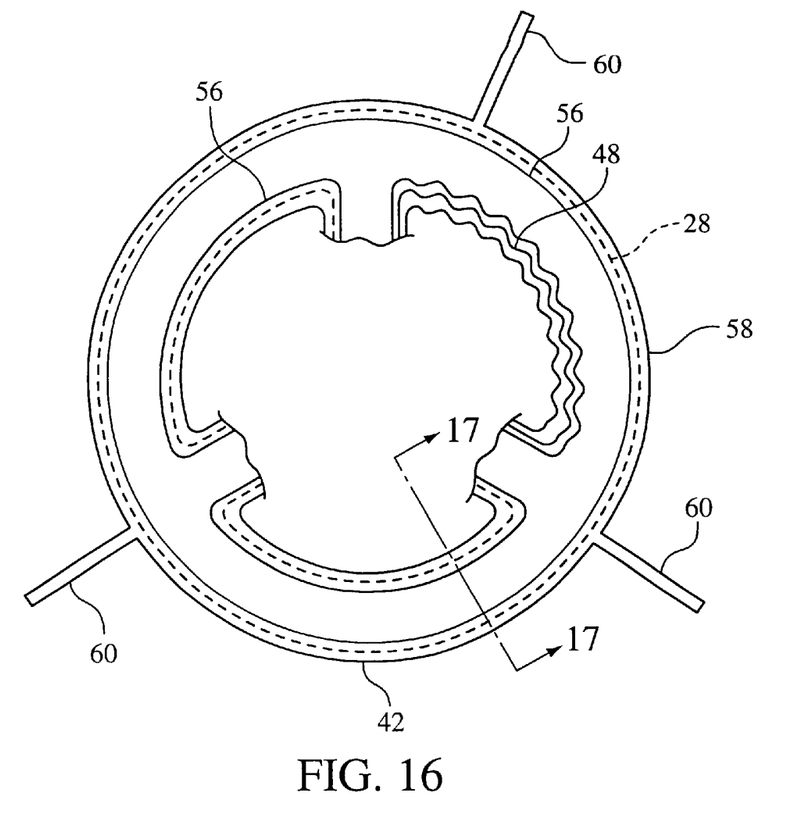
FIG. 16 is a schematic of an alternative method of manufacturing the preformed heating element involving injection molding.
Figure 17:
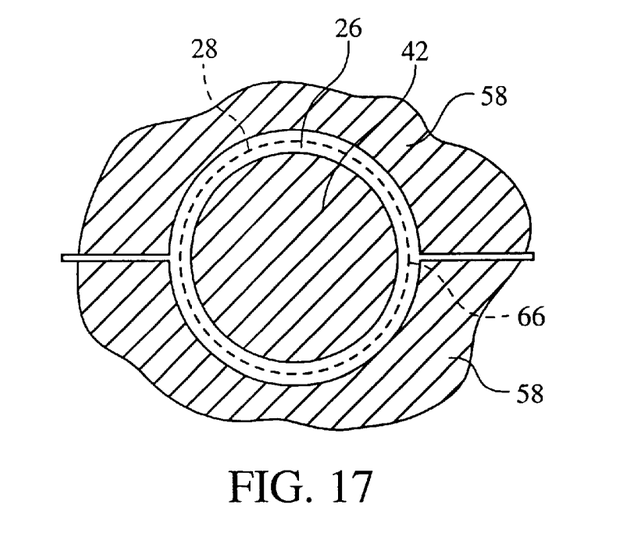
FIG. 17 is a view along lines 17—17 of FIG. 16.
Figure 18:
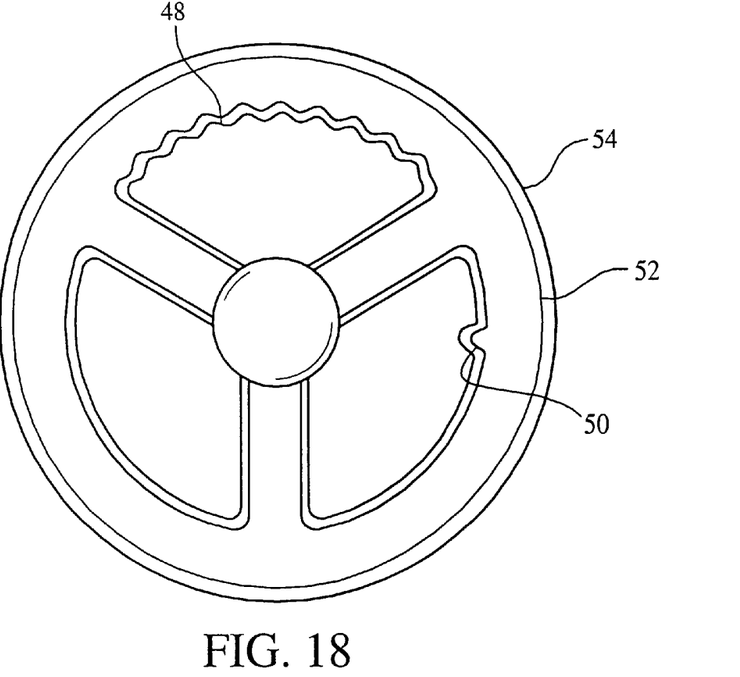
FIG. 18 is a schematic of an alternative method of manufacturing the preformed heating element involving pultrusion progressive die.

Referring to FIGS. 16 and 17, yet another alternative method of manufacturing the preformed heating element is illustrated, involving an injection molding of a thermoplastic elastomeric rubber compound onto the heating element. The process begins with placing the heating element 28 around steering wheel mold 42 having the configuration and dimensions of the heated steering wheel, as described above in previous methods. The heating element is then secured lightly on the mandrel with adhesive material 56 such as a binder agent, or alternatively, secured with a plurality of pins, or yet alternatively, some magnetic means. To complete the mold, a pair or a plurality of mold portions or molding tools or outer mold portions 58 are then secured around steering wheel mold 42, where the injection molding is applied through a plurality of injection pins 60 disposed on outer mold portion 58. It should be appreciated that utilizing more than one injection pin 60 for spraying the rubber or polyurethane material onto the carbon fiber member creates a smoother and more uniform finish on the preformed heating element. It should also be appreciated that the bus bars and the terminal wire may also be embeddedly injection molded onto the heating element. In addition, the thermister may also be placed to be embeddedly injection molded into the preformed heating element. The heating element and thermister are not viewable through the thin leather covering, as they are embedded into the smooth surface of preformed heating element 26.

Once the injection molded carbon fiber member is cured on steering wheel mold 42, it is then removed from around the mold. In order to remove the preformed heating element, an automated cutting knife cuts along a seam line on the interior side of the preformed heating element, creating split line 38. The location of the split line along the interior surface of the preformed heating element provides an out-of-sight location for the imperfections which may result from the sewn outer wrap 30 along split line 38.

Alternatively, and as illustrated by the dashed lines in FIG. 17, the mold portions of the mold have a portion 66 that makes contact with the mandrel at a point to provide a split line, therefore negating the need to cut the preformed heating element from the mandrel.

Figure 13:
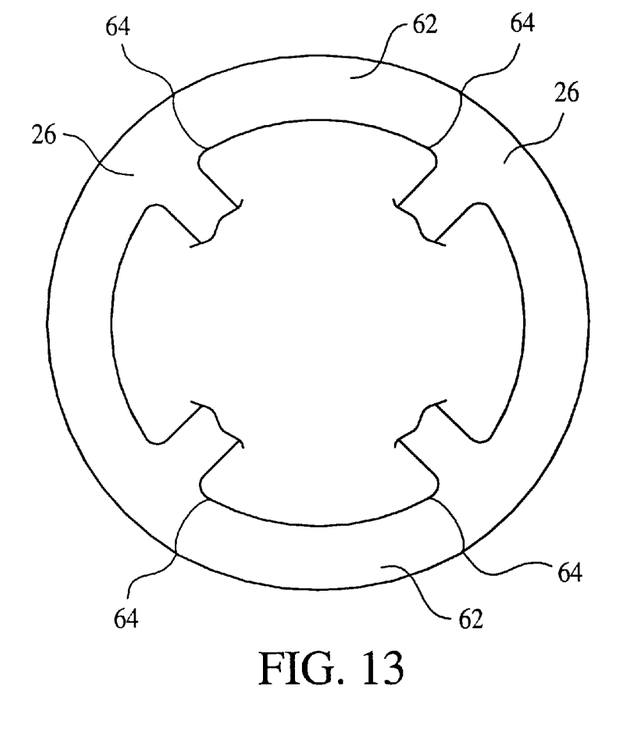
FIG. 13 is a view illustrating a preformed heating element for use with a steering wheel having decorative portions.

Referring to FIG. 13, another alternative method of manufacturing the preformed heating element, involving a pultrusion progressive die preform process, is illustrated. This process utilizes the benefit of the thermoset pultrusion process for impregnating the heating element with a thermoset polyester or vinylester. The pultrusion progressive die process is very rapid and low cost. The pultrusion process is well established. However, combining the progressive die process with the conventional pultrusion methods enables the heating elements in the preformed shape to be manufactured more economically. The process begins with impregnating the heating element with a sufficient amount of resin, which depends on the desired porosity and stiffness of the preformed heating element. The resin-impregnated heating element is then passed through a series of progressive heated dies which would shape the resin-impregnated heating element in the desired shape of the steering wheel.

Alternatively, a thermoplastic pultrusion progressive die process can be utilized which includes pulling the heating element, the bus bars, and the thermoplastic material through the pultrusion line all at the same time. The composite material would then go through a heated progressive die as explained above.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A preformed heating member, comprising:
   a conductive member for receiving an electrical current and providing a source of heat; and
   a flexible member having resilient qualities, said conductive member being embedded into said flexible member, said flexible member having an opening, said flexible member being configured and dimensioned to allow said flexible member to be placed over a steering wheel of a vehicle.

2. The preformed heating element as in claim 1, wherein said conductive member is a carbon fiber textile material.

3. The preformed heating element as in claim 1, wherein said preformed element is formed from a liquid injection molding process.

4. The preformed heating member as in claim 1, further comprising;
   a spoke opening being configured to accommodate a spoke of a steering wheel.

5. The preformed heating member as in claim 1, wherein said flexible member is manufactured using a vacuum-bagging process.

6. The preformed heating member as in claim 5, wherein said flexible member is manufactured out of a silicon rubber.

7. The preformed heating member as in claim 5, wherein said flexible member is manufactured out of a thermally conductive silicon rubber.

8. The preformed heating member as in claim 5, wherein said conductive member is a flexible wire mesh.

9. The preformed heating member as in claim 6, further comprising a control device for controlling the heat of said preformed heating member.

10. The preformed heating member as in claim 5, wherein said flexible member is configured to have a plurality of finger forms corresponding to a plurality of finger forms on said steering wheel.

11. The preformed heating member as in claim 5, wherein said flexible member is configured to a tab locator portion corresponding to a tab locator portion on said steering wheel.

12. The preformed heating member as in claim 4, wherein said flexible member is manufactured using a liquid injection molding process.

13. The preformed heating member as in claim 4, wherein said flexible member is manufactured using a resin transfer molding process.

14. The preformed heating member as in claim 4, wherein said flexible member is manufactured out of a resin injection molding nylon.

15. A method for molding a preformed heating element having a smooth exterior surface, comprising:
   adhering a first layer of silicon rubber to a steering wheel mold;
   adhering an adhesive tape to said first layer of silicon rubber steering wheel mold, said adhesive tape having a heating element disposed on one side;
   adhering a second layer of silicon rubber to said adhesive tape;
   vacuum-bagging said adhesive tape and said first and second layers of silicon rubber;
   heating said adhesive tape and said first and second layers of silicon rubber until said adhesive tape and said first and second layers of silicon rubber form about said steering wheel mold; and
   curing said adhesive tape and said first and second layers of silicon rubber.

16. The method as in claim 15, wherein said silicon rubber is thermally conductive.

17. The method as in claim 15, wherein said heating element is a single wire lead.

18. A preformed heating member, comprising:
   a flexible member having an inner surface and an outer surface, said flexible member having resilient qualities, said outer surface providing a smooth surface for a decorative material to be applied;
   an opening along the length of said flexible member;
   a spoke opening being configured to accommodate a spoke of a steering wheel; and
   a conductive member for receiving an electrical current and providing a source of heart, said conductive member being embedded within said flexible member.

19. The preformed heating member as in claim 18, wherein said decorative material is leather.

20. The preformed heating member as in claim 18, wherein said preformed heating element has a thickness of 1 mm.

21. A preformed heating member, comprising:
   a conductive member for receiving an electrical current and providing a source of heat, said conductive member being embedded by a flexible member; and
   an elongated opening being disposed along an edge of the preformed heating member said elongated opening being configured and dimensioned to allow the preformed heating member to be biased into an open position and placed over a portion of a steering wheel of a vehicle, wherein movement of said flexible member of said preformed heating member from a resting state to a biased state upon the application of a force allows said preformed heating member to be disposed about said steering wheel and said preformed heating member returns to said resting state upon the removal of said force, said shape retention qualities of said flexible member returns said preformed heating member to said resting state.

22. The preformed heating member as in claim 21, wherein said resting state is a configuration resembling the exterior surface of a steering wheel.

23. A preformed heating member, comprising:
   a conductive member for receiving an electrical current and providing a source of heat;
   a flexible member being formed of a material having memory characteristics and being capable of the being manipulated from a closed configuration into an open configuration and returning to said closed configuration due to the memory characteristics of said flexible member, said conductive member being embedded within said flexible member; and
   an elongated opening along the length of said preformed heating member wherein said flexible member is configured and dimensioned to allow said flexible member to be placed over a steering wheel of the vehicle when said flexible member is in said open configuration and said flexible member being positioned around said steering wheel when said flexible member returns to said closed configuration.

24. The performed heating member as in claim 23, wherein said flexible member is formed out of a thermoplastic elastomeric rubber compound and said preformed element is formed from a liquid injection molding process.

25. The preformed heating member as in claim 23, wherein said flexible member is a silicon rubber and said heating member is manufactured using a vacuum-bagging process.

26. The preformed heating member as in claim 25, wherein said flexible member is manufactured out of a thermally conductive silicon rubber and said heating element is a flexible wire mesh.

27. The preformed heating member as in claim 23, wherein said flexible member is configured to have a plurality of finger forms corresponding to a plurality of finger forms on said steering wheel.

28. The preformed heating member as in claim 23, wherein said flexible member is manufactured using a resin transfer molding process and said flexible member is manufactured out of a resin injection molding nylon.

29. The preformed heating member as in claim 23, wherein said flexible member only covers a portion of a steering wheel rim.

30. The preformed heating member as in claim 23, wherein said flexible member completely covers an entire steering wheel rim.

31. The preformed heating member as in claim 23, wherein said elongated opening and said preformed heating member are configured to have an arcuate shape that matches the curvature of a portion of a steering wheel rim.

32. A method for molding a preformed heating element having a smooth exterior surface and memory retention characteristics, comprising:

adhering a first layer of a resilient material to a steering wheel mold;

disposing a heating element on said first layer;

adhering a second layer of a resilient material to said heating element;

forming the preformed heating element, whet said heating element is encased within said first and second layers; and curing said preformed heating element wherein said preformed element provides a smooth continuous surface for application of an aesthetic cover thereon and said preformed heating element returns to its cured configuration after it has been deformed through the application of an opening force.

* * * * *